United States Patent [19]
Mount

[11] Patent Number: 4,542,564
[45] Date of Patent: Sep. 24, 1985

[54] METHOD OF MAKING ELECTRICAL CONNECTIONS TO THIN FILM COATINGS

[75] Inventor: Bruce E. Mount, Diamond Bar, Calif.

[73] Assignee: The Perkin-Elmer Corporation, Norwalk, Conn.

[21] Appl. No.: 533,488

[22] Filed: Sep. 19, 1983

Related U.S. Application Data

[62] Division of Ser. No. 316,176, Oct. 29, 1981, Pat. No. 4,425,526.

[51] Int. Cl.[4] .............................................. H01L 41/22
[52] U.S. Cl. ..................................... 29/25.35; 310/800
[58] Field of Search ................ 73/119 A, 730, 861.18; 310/800, 338, 328; 29/25.35

[56] References Cited

U.S. PATENT DOCUMENTS 4,216,403  8/1980  Krempl et al. ................. 310/800 X
4,304,126  12/1981  Yelke .............................. 310/800 X

*Primary Examiner*—Carl E. Hall
*Attorney, Agent, or Firm*—Randall G. Wick; Thomas P. Murphy; Edwin T. Grimes

[57] ABSTRACT

Disclosed is a method of making electrical connections to thin film coatings and the electrical connector formed thereby especially useful in a fluid flowmeter. The film with its conductive coating is pressed against a rigid, relatively long, connector bar by conductively coated pads of elastomeric material at a selected controlled pressure with the electrical connections to the film coating being made through the bar and pads. Utilizing this method, localized high stress area which cause damage to the thin film are avoided, and low current densities are accomplished by the controlled contact pressure over a large area of the film coating.

4 Claims, 4 Drawing Figures

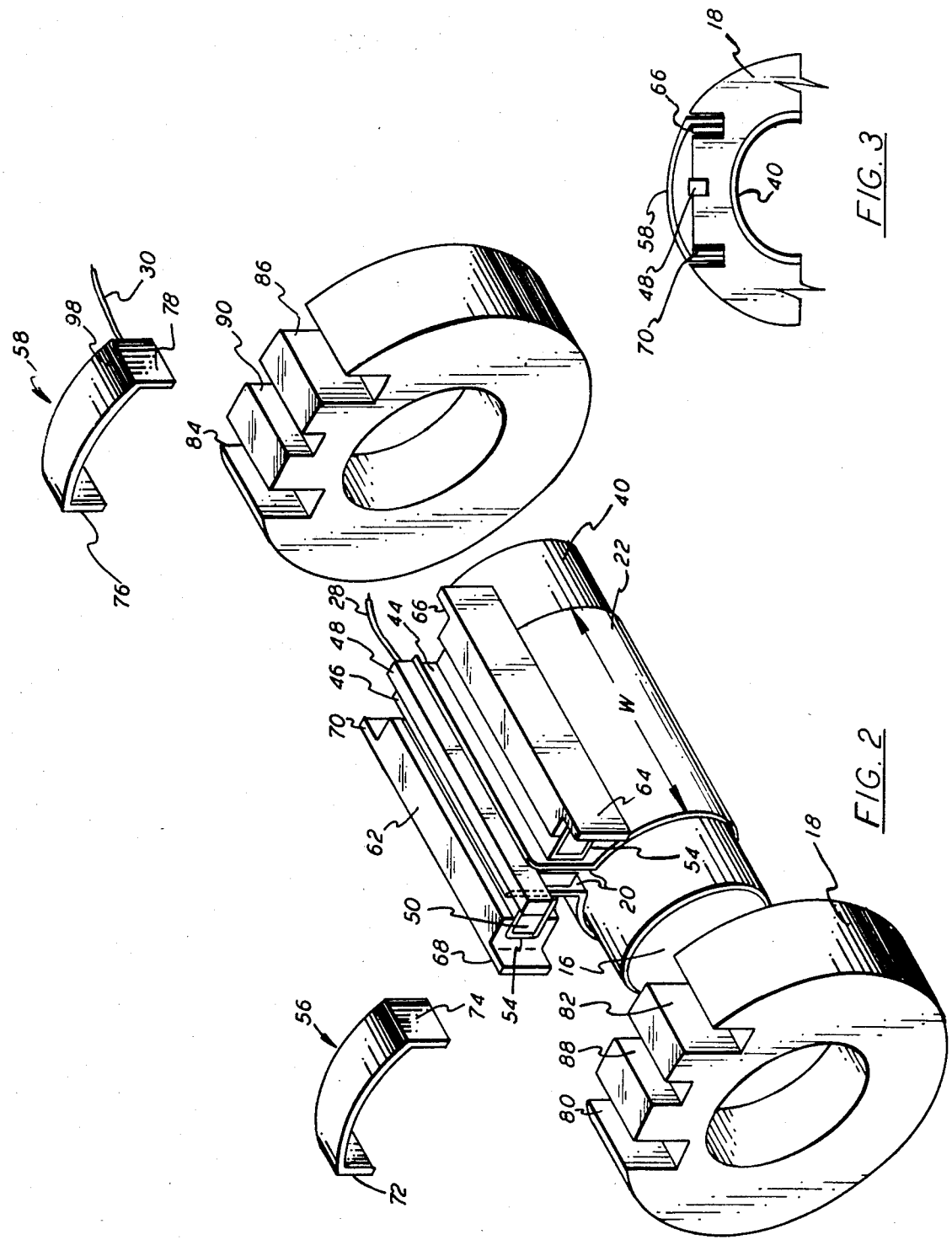

METHOD OF MAKING ELECTRICAL CONNECTIONS TO THIN FILM COATINGS

This application is a division of application Ser. No. 316,176, filed Oct. 29, 1981, U.S. Pat. No. 4,425,526.

BACKGROUND OF THE INVENTION

This invention relates broadly to a method for making electrical connections involving thin film material and to the electrical connection formed thereby. This invention is especially useful in the flowmeter of the type described and claimed in the U.S. Pat. No. 4,164,865 entitled, "Acoustical Wave Flowmeter" by L. G. Hall and R. S. Loveland, which issued Aug. 21, 1979 and the flowmeter of the U.S. Pat. No. 4,003,252 entitled, "Acoustical Wave Flowmeter" by E. J. Dewath, which issued Jan. 18, 1977.

A simplified reproduction of one of the figures of the Hall and Loveland U.S. patent drawings is reproduced herein for convenient reference and identified as FIG. 1, Prior Art. The Hall and Loveland system eliminated all impediments to the flow path of the fluid, all cavities in which debris might collect, measured flow accurately regardless of changes in fluid composition or temperature, and determined a change in velocity of sound of the fluid being measured as a function of fluid density.

In order to accomplish this, the Hall and Loveland acoustical wave flowmeter 10 had two, spaced apart, crystal transducers 12 and 14 surrounding the wall or flowmeter conduit 16 (sometimes called a cavity) in the support ring 18 to produce ultrasonic acoustic compressions at selected frequencies in the fluid within the cavity. The inside and outside surfaces 20-26 of the transducers, shown connected by electrical conductors 28-34 to electronic circuitry 36, were alternately switched by the circuitry 36 into a transmit and a receive mode to generate upstream and downstream transmitted and received signals with an automatic means to adjust the transmitted frequencies to compensate for changes in velocity of the acoustic compressions in the fluid caused by changes in fluid composition and temperature. The electronic circuitry 36 also included, among other things, means for measuring and storing signals representing the phase difference between the transmitting transducer signal which produced compressions and the signal produced by the receiving transducer in response to such compression during each of two successive transmit/receive cycles and processed these signals to indicate flow and change of velocity of the sound traveling through the fluid being measured.

The transducers 12 and 14, represented in FIG. 1, and shown rather thick, are of the crystal type. This type of transducer was found to have a high Q and to be self resonating at the frequencies of interest. This limited the range of frequencies usable in the transducer. Film type transducers also referred to in the U.S. patents, supra, were found, not only to be lighter in weight, but to have a wider band width and thus increased the usable frequency for the transducer. These films, however, are formed of relatively thin coated piezo film approximately 1,000 Å thick. Being so thin, the problem of good electrical connection between the electrical conductors and these surfaces becomes difficult to achieve.

The criteria is that electrical connections to the coated film must not damage the film coating physically, and must contact the coating over a large area for low current density for the maximum transfer of electrical energy between the coating and the conductors, and must contact both ends of the coating to minimize conduction delay of energy at ultrasonic frequencies along the length of the thin foil due to significant distributed resistances and capacitances—the so-called delay line effect. Existing techniques utilize conductive epoxy connections and direct metal-to-metal connections between the film and the conductors. These techniques sometimes cause fracturing of the coating due to local high stress areas and cause high current densities due to non-uniform contact areas.

SUMMARY OF THE INVENTION

Utilizing the teachings of this invention which is especially useful in the flowmeter art, a good electrical connection is made between the conductors and the thin film coating over large areas and contact is made to both ends of the coating to avoid localized high stress areas and high current densities. To accomplish this, a thin piezo film, coated on both sides, is wrapped around a cylindrical liner or film support. One layer (coating), the inside layer, is brought into electrical contact with both sides of a relatively thick electrical conductor bar and pressed against this conductor bar by conductors which are thinly coated conductive, resilient pads which also make electrical contact with the other (outside) surface layer (coating) of the film. The conductor bar and the conductive, resilient pads have relatively large surfaces so that both the inner and outer surfaces of the film are connected over a large area at a controlled pressure. The bar and pads are connected, respectively, to electrical conductors so as to form a transducer in a flowmeter.

While the method of making a metallic, thin film connector and the connector itself are described in connection with a flowmeter, other applications for this invention will be apparent to those skilled in the art after studying the drawings and reading the following detailed description.

Also, it will be apparent that the application of electrical energy at the same time to both ends of the inside and outside layer, respectively, reduces the aforementioned delay line effect in the layers.

BRIEF DESCRIPTION OF THE DRAWINGS

FIG. 2 is a perspective, partially expanded, enlarged view of the electrical connection to form a transducer made in accordance with the teachings of this invention, FIG. 3 is a partial elevational view of one electrical connection of FIG. 2.

DETAILED DESCRIPTION

Figure 1:
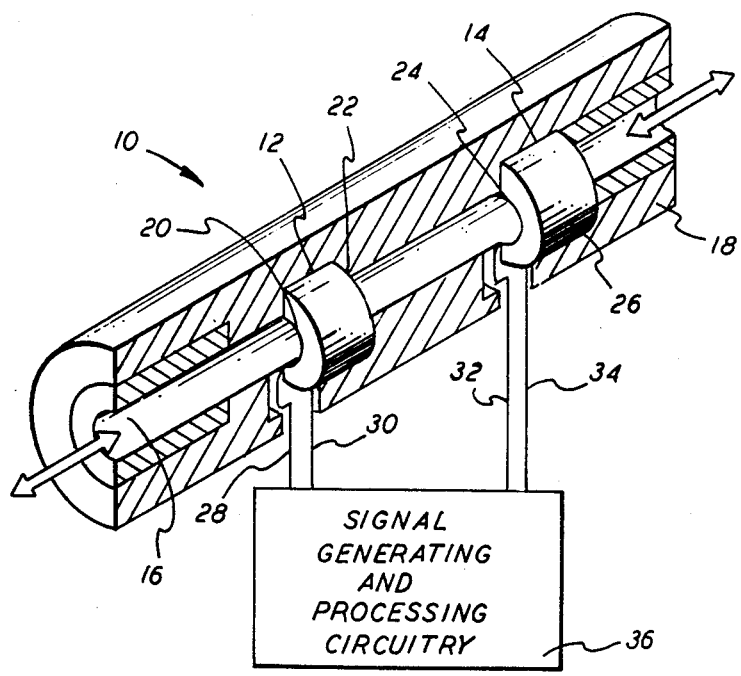
FIG. 1 is a perspective view of a prior art flowmeter.
Figure 4:
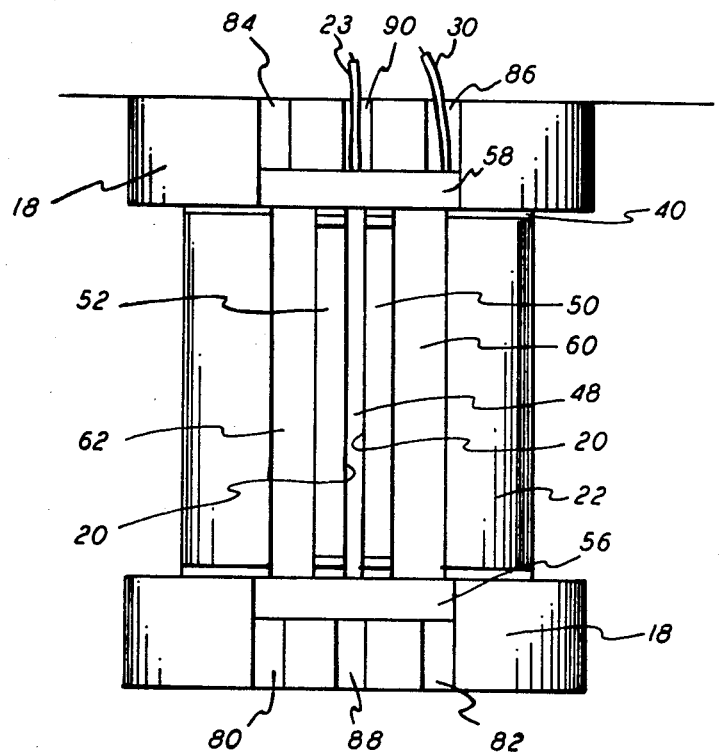
FIG. 4 is a plan view of the transducer made in accordance with the teachings of this invention and incorporated in a flowmeter (shown partially and broken away for clarity).

FIGS. 2 and 3 show one transducer 12 with a cylindrical, relatively rigid liner or film support 40 having an inner wall which forms the flow path or cavity 16 described in connection with FIG. 1. The liner is supported in support rings 18 which corresponds in function to the support ring 18 of FIG. 1. Support rings 18 are slipped over the liner 40 and serve to space the liner from a housing (not shown) to accommodate the electrical connections of this invention. A piezo film substrate material, i.e., a strip 22, of width w, coated on both sides with a conductive material, is wrapped around and adhered to the outer wall of the liner. The coated film is cut, or otherwise formed, longer than the circumference of the liner to provide a pair of large end areas 44 and 46, shown parallel in the drawings, between which a relatively rigid central conductor bar 48, solid or coated with a conductive material, is located. The side walls of the bar provide areas substantially the same as the end areas 44 and 46. The coating nearest the bar and nearest the outside wall of the liner becomes the inner surface 20 as described in connection with FIG. 1. Thus, the film is positioned so that the end areas of one coating (inner surface 20) face each other and face the opposite sides of the conductor bar 48 therebetween. The outside coating, that is, the outside surface 22 as described above, is contacted by a pair of pads 50 and 52 of generally the same length as the conductive bar. Both the bar 48 and the pads 50 and 52 are shown to have the same length as width w of the film with one side of the pads providing areas of contact which correspond to the areas of the ends 44 and 46 of the inside surface 20 which engage the bar 48. Actually, with the bar wide enough and the coating on the film also being of size to correspond to the sides of the bar, it is the size of the pads which determines the area of contact of the film coating with the conductor bar and pads.

The pads, in one embodiment, are of resilient (elastomeric) material, coated with a conductive material 54, which makes an electrical contact with the outside surface 22. These pads are pressed against the outside surface 22 and the inside surface 20 is, in turn, pressed against the conductive bar 48 to form the electrical connection. The pads are held in place with a controlled pressure against the film by clamping means in the form of end retainer clips 56 and 58 which hold two channel members 60 and 62 against the pads over the entire length of the film corresponding to the width w. These retainer clips 56 and 58 are conductive and engage extensions 64–70 of each of the outside walls of the channel members. The ends 76–78 of the retainer clips are, respectively, seated in a pair of longitudinal recesses or grooves 80–86 in the support rings 18. The support rings are also recessed or grooved as at 88 and 90 between the previously mentioned recesses to receive the ends of relatively thick conductor bar 48. The size and relationship of the retainer clips, the size and shape of the channel members, and the cross-sectional area of the pads are selected to exert a pre-selected, controlled force on the film coatings.

Electrical conductor 30 is connected, as by soldering, to one retainer clip such as 58, to connect the outer surface 22 to the circuitry 36 and conductor 28 is connected, as by soldering, to the center bar to connect the inner surface 28 to the circuitry 36. The soldering step to make the electrical connections is done before assembly of the transducer to prevent damage to the piezo film. The center portions 96 and 98 of the retainer clips are curved to space the clip from the center bar 48 to prevent a short circuit between the center bar and the retainer clip, both of which are conductive (see FIG. 3).

By way of example, a piezo film is a polarized, plastic material (polyvinylidene fluoride) available under the trademark Kynar from Pennwalt Corporation of King of Prussia, Pa. and is of 0.001 inch thick coated with gold or aluminum, preferably with a coating resistance of less than one ohm per square (sheet resistance). The elastomeric material forming pads 50 and 52 is silicone rubber coated with gold-plated copper or aluminum foil, depending upon whether the film is coated with gold or aluminum, and typically 0.0001 inch thick. The elastomer is typically at 150 psi via fixed compression, typically 15% to 20%, exerted by the two force channel members. Alternatively, the elastic material of the pads may be replaced with electrically conductive elastomeric material, such as silicone rubber filled with fine silver particles. In the latter case, the foil 54 may be eliminated.

What is claimed is:

1. A method of forming electrical connections to a piezo film, said film having a conductively coated outer surface and a conductively coated inner surface, said method comprising the steps of:

positioning the film of a selected width and length so that the coating on the inner surface of end areas of the film face each other, placing a relatively rigid conductor bar between said end areas, said bar having a length substantially equal to the width of said film, providing a pair of elastomeric conductive pads having lengths substantially equal to the width of said film, pressing said pads against said end areas on the side opposite the film from the conductive bar at a selected pressure to make electrical contact between said outer conductive surface and said pads across the width of said film, and to force said inner conductive surface of said film into electrical contact with said rigid conductor bar across the width of said film, and connecting the conductive bar and the conductive pads to electrical conductors so that electrical signals may be applied to the coated film.

2. The method of claim 1 further including the step of providing a supporting means for positioning the film so that the coating on the end areas on one side face each other.

3. The method of claim 2 further including the step of providing clamping means to press the conductive pads against said coated film.

4. The method of claim 2 wherein the supporting means is cylindrical and further includes the step of adhering the film to said supporting means.

* * * * *